United States Patent
Kopetz

(10) Patent No.: US 9,697,096 B2
(45) Date of Patent: Jul. 4, 2017

(54) METHOD FOR LIMITING THE RISK OF ERRORS IN A REDUNDANT, SAFETY-RELATED CONTROL SYSTEM FOR A MOTOR VEHICLE

(71) Applicant: FTS COMPUTERTECHNIK GMBH, Vienna (AT)

(72) Inventor: Hermann Kopetz, Baden (AT)

(73) Assignee: FTS COMPUTERTECHNIK GMBH, Vienna (AT)

(*) Notice: Subject to any disclaimer, the term of this patent is extended or adjusted under 35 U.S.C. 154(b) by 31 days.

(21) Appl. No.: 14/776,210

(22) PCT Filed: Mar. 13, 2014

(86) PCT No.: PCT/AT2014/050061
§ 371 (c)(1),
(2) Date: Sep. 14, 2015

(87) PCT Pub. No.: WO2014/138764
PCT Pub. Date: Sep. 18, 2014

(65) Prior Publication Data
US 2016/0034367 A1 Feb. 4, 2016

(30) Foreign Application Priority Data

Mar. 14, 2013 (AT) .................... A 198/2013
Sep. 17, 2013 (AT) .................... A 50592/2013

(51) Int. Cl.
| | | |
|---|---|---|
| G06F 11/20 | (2006.01) | |
| G05B 9/03 | (2006.01) | |
| B60T 8/88 | (2006.01) | |

(52) U.S. Cl.
CPC ......... *G06F 11/2028* (2013.01); *B60T 8/885* (2013.01); *G05B 9/03* (2013.01);
(Continued)

(58) Field of Classification Search
CPC ............... B60T 8/885; B60T 2270/402; B60T 2270/406; B60T 2270/413; G05B 9/03;
(Continued)

(56) References Cited

U.S. PATENT DOCUMENTS

| | | |
|---|---|---|
| 6,317,675 B1 | 11/2001 | Stolzl et al. |
| 2003/0055550 A1 | 3/2003 | Lohberg et al. |

(Continued)

FOREIGN PATENT DOCUMENTS

| | | |
|---|---|---|
| AT | 50592/2013 | 3/2013 |
| DE | 10015225 A1 | 4/2001 |

(Continued)

OTHER PUBLICATIONS

Edgar C. Ramirez, "Diverse redundancy used in SIS technology to achieve higher safety integrity", all pages, published May 8, 2008, Retrieved from http://www.controlglobal.com/assets/assets/abb_wp_diverse_redundancy.pdf.*

(Continued)

*Primary Examiner* — Calvin Cheung
(74) *Attorney, Agent, or Firm* — Eversheds Sutherland (US) LLP

(57) ABSTRACT

The invention relates to a method and a device for limiting the risk of faults in a control system, in particular a safety-relevant control system, wherein a preferably intelligent actuator controller (AST), by means of the application of a weighted mean value algorithm, calculates a new control value from the two control values determined by means of diverse redundancy by two independent fault-containment units (FCUs), which new control value, in spite of the occurrence of a fault in one of the two FCUs, causes an object to be controlled by the control system to be guided into a safe state, preferably quickly.

9 Claims, 1 Drawing Sheet

(52) U.S. Cl.
CPC ... *B60T 2270/402* (2013.01); *B60T 2270/406* (2013.01); *B60T 2270/413* (2013.01); *G05B 2219/2637* (2013.01); *G06F 2201/86* (2013.01)

(58) Field of Classification Search
CPC ......... G05B 2219/2637; G06F 11/2028; G06F 2201/86
See application file for complete search history.

(56) References Cited

U.S. PATENT DOCUMENTS

| | | | |
|---|---|---|---|
| 2005/0216134 A1 | 9/2005 | Katrak et al. | |
| 2008/0312790 A1* | 12/2008 | Fey | B60R 21/0132 701/38 |
| 2009/0189441 A1* | 7/2009 | Degoul | B60T 8/885 303/199 |
| 2010/0152985 A1* | 6/2010 | Petzold | F16D 48/066 701/68 |
| 2010/0301878 A1* | 12/2010 | Armbruster | G01F 23/0061 324/676 |
| 2012/0136540 A1* | 5/2012 | Miller | B62D 5/001 701/42 |
| 2015/0032302 A1* | 1/2015 | Foerster | B60T 17/228 701/19 |
| 2015/0158499 A1* | 6/2015 | Koravadi | B60T 7/12 701/23 |
| 2015/0340854 A1* | 11/2015 | Richter | H02H 3/05 361/86 |

FOREIGN PATENT DOCUMENTS

| | | |
|---|---|---|
| DE | 10155119 A1 | 5/2003 |
| DE | 102007060036 A1 | 7/2009 |
| DE | 102009020022 A1 | 11/2010 |
| DE | 102009029151 A1 | 3/2011 |
| EP | 0496509 B1 | 7/1992 |

OTHER PUBLICATIONS

"Redundancy", date unknown, Retrieved from http://people.sunyit.edu/~lepres/thesis/principles/205_pdfsam_POD.pdf.*
Office Action dated Aug. 14, 2013 for Austrian Patent Application No. A 198/2013.
International Search Report for PCT/AT2014/050061 dated Aug. 7, 2014.
Euro NCAP Rating Review, Jun. 2012. Online at: http://www.euroncap.com.
Kopetz H., "Real-Time Systems, Design Principles for Distributed Embedded Applications," 2d Ed., Springer Publishing Company 2011, pp. 136-138.
Littlewood, B., et al. "Validation of Ultra-High Dependability for Software-Based Systems" Comm. ACM. vol. 36 (11). (pp. 69-80) (1993).
Examination Report issued in EP application No. 14718311.5, mailed Mar. 31, 2017.

* cited by examiner

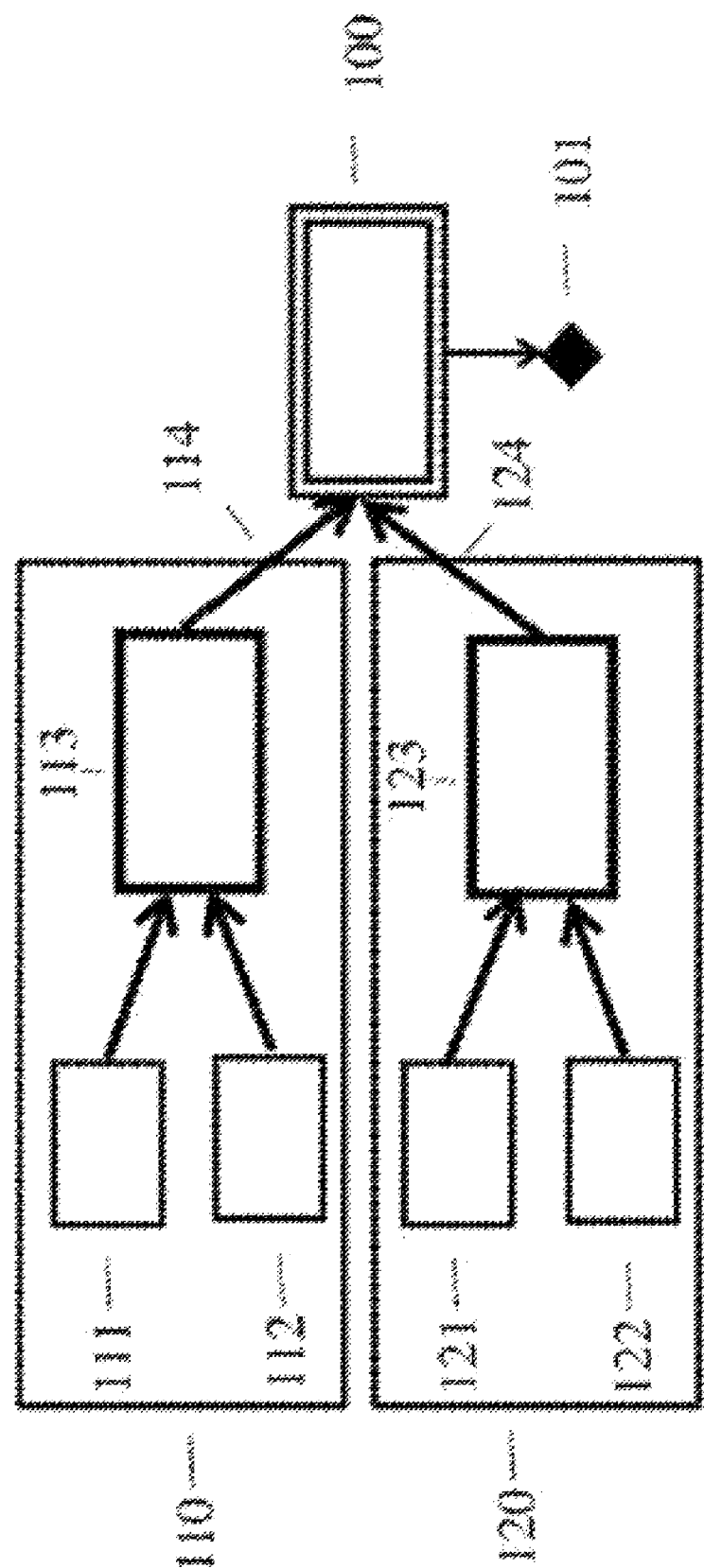

METHOD FOR LIMITING THE RISK OF ERRORS IN A REDUNDANT, SAFETY-RELATED CONTROL SYSTEM FOR A MOTOR VEHICLE

The invention relates to a method and a device for limiting the risk of faults in a control system, in particular a safety-relevant control system.

The invention also relates to a method and a device for limiting the risk of faults in an autonomic emergency braking (AEB) system of a vehicle.

In addition, the invention relates to a control system, in particular a safety-relevant control system, for example autonomic emergency braking (AEB) system of a vehicle, comprising such a device.

Lastly, the invention also relates to a motor vehicle comprising at least one such control system.

The present invention lies in the field of control of cyber-physical systems (CPSs). It describes an innovative method for attenuating the consequences of software and hardware faults by the use of diverse redundancy.

The technical developments in the field of microelectronics enable the economical construction of autonomous technical systems. In an autonomous technical system, consisting of a technical installation, the object to be controlled (physical system—PS) and a computer system controlling the object (cyber system—CS), the CS uses a sensor system to monitor the behaviour of the PS and autonomously calculates suitable control values for the actuator system of the object to be controlled.

From the viewpoint of information processing, the cyclically operating CS performs a gigantic data reduction. An imaging sensor system detects megabits of data in each cycle via cameras or other sensors (for example radar or laser) and reduces this data to the specifications for one or a few control values, wherein such a specification can be expressed in a ten-bit data field.

The algorithms and therefore the image processing software, which analyse an image and from this calculate the suitable control values, are very comprehensive. Since this image processing software cannot be fully tested on account of its breadth [3], it is probable that the software contains undetected design faults, which under certain circumstances lead to false results. A fault in the CS—whether a fault in the algorithm, in the programming, or a hardware fault—leads to a fault in one or a few bits of a control value ten bits wide.

The object of the present invention is to enable a limitation of the effects of a fault in a CS system of this type.

This object is achieved with a method as mentioned in the introduction and/or a device as mentioned in the introduction for limiting the risk of faults in a control system, in that, in accordance with the invention, a preferably intelligent actuator controller (AST), by means of the application of a weighted mean value algorithm, calculates a new control value from the two control values determined by means of diverse redundancy by two independent fault-containment units (FCUs), which new control value, in spite of the occurrence of a fault in one of the two FCUs, causes an object to be controlled by the control system to be guided into a safe state, preferably quickly.

This object is also achieved with a method of the type mentioned in the introduction and/or with a device of the type mentioned in the introduction for limiting the risk of faults in an autonomic emergency braking (AEB) system of a vehicle in that, in accordance with the invention, a preferably intelligent actuator controller (AST), by means of the application of a weighted mean value algorithm which weights the control value of the FCU stipulating a higher braking force more heavily by a predefined weight g than the control value of the FCU stipulating a lower braking force, calculates a new control value for the braking force from the two control values for the braking force determined by means of diverse redundancy by two independent fault-containment units (FCUs), and uses this new control value for the braking force in the vehicle.

In accordance with the invention it is proposed to provide two independent diverse systems in order to evaluate the sensor data.

Two computer systems are diverse when they use different hardware and/or different algorithms to calculate the results. If two diverse systems have been tested sufficiently, it is unlikely that a set of input data will cause simultaneously a fault in both diverse systems.

The two diverse systems each calculate, in parallel, a control value for an actuator. In the normal case, when no fault is present, the two control values are identical. If there is a fault present, the two control values thus differ, wherein it is not possible to decide which of the two control values is erroneous. In accordance with the invention it is proposed, in the case of the deviation of the two control values, to determine a new control value from the two present control values by means of a weighted mean value algorithm, which new control value, by means of the suitable selection of the weighting, prefers the control value that leads quickly to a safe state of the PS.

In the published patent literature US patent application [1] was found, which relates to the modelling of the consequences of a fault in order to be able to attenuate these consequences.

Preferred embodiments of the devices according to the invention and of the methods according to the invention, which can be produced alone or in any combination with one another, are described hereinafter:

- the control value determined in the current cycle, by means of the formation of a further weighted mean value from the control value of the past cycle and the determined control value in the current cycle, is corrected in such a way that the weighting of the control value in the past cycle increases when the difference between the two control values calculated in the current cycle increases;
- the method according to one of Claims 1 to 3, characterised in that the preferably intelligent actuator controller is formed on a self-checking hardware;
- the preferably intelligent actuator controller files a fault message in a diagnosis store in the event of the occurrence of unequal control values.

The present invention discloses a method for limiting the effects of faults in a computer system on the behaviour of a technical installation (object to be controlled, physical system) by means of diverse redundancy in a cyber-physical system (CPS). In accordance with the method two independent diverse computer systems are to be used to evaluate the sensor data and calculate the control values. If the two control values differ on account of a fault, a new control value is calculated from the two present control values via a weighted mean value algorithm, which new control value, by means of the selection of the weighting, prefers the control value that leads the installation quickly into a safe state.

The method according to the invention will be explained hereinafter on the basis of the example of an autonomic braking system in a vehicle with reference to the drawing, in which the sole The FIGURE shows the structure of a redundant control system according to the invention, The following specific example of an autonomous braking system in a vehicle shows one of the many possible embodiments of the method according to the invention.

In June 2012 the NCAP (European New Car Assessment Program) Organisation published a roadmap [4], from which it is clear that from the year 2016 Autonomous Emergency Braking (AEB) systems are to be introduced into new motor vehicles on a broad level. The reliability and safety of autonomous braking systems can be improved with the present invention.

The key concept of the present invention—with respect to AEB systems—lies in dividing the sensors monitoring the environment and the electronics necessary for evaluation into two self-sufficient fault-containment units (FCUs) [2] and fusing the control values determined by the two independent FCUs in such a way that the vehicle, even in the event of the occurrence of a fault in an FCU, can be brought quickly into a safe state. An FCU is to be understood to mean an encapsulated sensor/hardware/software subsystem, wherein the immediate effects of a fault of this subsystem (irrespective of whether this is a hardware or software or sensor fault) are limited to this subsystem [5, page 136]. An FCU is self-sufficient when this FCU is able to provide the requested functionality without reference to a further FCU.

In accordance with the invention an AEB system consists of the two FCUs 110 and 120. The FCU 110 has sensors (for example camera, radar) 111 and 112 for monitoring the surrounding environment of the vehicle. The FCU 120 has sensors 121 and 122. The sensors 111, 112, 121 and 122 are read out cyclically, wherein the duration of a cycle is typically 10 msec. In the FCU 110 the sensor fusion component 113 receives the sensor data and calculates a control value for the brake actuators, wherein the control value 0 means do not brake and the control value 1 means activate the maximum braking force. The sensor fusion component 123 calculates the control value of the FCU 120 analogously. The two control values are output via the data lines 114 and 124 to the intelligent actuator controller (AST) 100 in order to control the braking. The AST 100 can be executed on a self-checking hardware in order to immediately be able to identify a hardware fault of the AST 100. It is assumed that the relatively simple software of the AST 100 is free from design faults.

In the fault-free case the two control values of the FCUs 110 and 120 are identical and it is therefore irrelevant which of the two control values is received by the AST 100.

In the event of a fault, the two control values of the FCUs 110 and 120 are different. In an extreme case the FCU 110 in a cycle determines the value 1 (full braking) and the FCU 120 determines the value 0 (do not brake). Since it is assumed that only one FCU is erroneous, one of these two values is correct and the other is incorrect. It is not known which value is correct and which value is incorrect. If the correct value is 0 (do not brake), the selection of the incorrect value 1—unnecessary spontaneous full braking— may then lead to a rear-impact collision by the following vehicle. If, by contrast, the correct value is 1 (full braking), the selection of the incorrect value 0 will then likely lead to a collision. In order to limit the risk of an incorrect choice, it is proposed in the event of a fault (unequal control values of the two FCUs) to calculate a control value by means of a weighted mean value algorithm, which for safety reasons weights the alternative brake more heavily than the alternative do not brake.

It is also proposed that in the event of a fault (unequal control values) the intelligent AST files a fault message in the diagnosis memory of the vehicle.

In accordance with the invention the AST 100 determines the control value $B_i$ of the present cycle i from two control values of the FCUs 110 and 120 by applying the following formula $$B_i = (g \cdot B_{large} + B_{small})/(g+1)$$

wherein $B_{large}$ is the greater of the two control values and $B_{small}$ is the smaller of the two control values of the FCUs 110 and 120. The variable g indicates the weight with which the greater control value (brake heavily) is to be taken into consideration compared with the smaller control value (brake less heavily).

In the following example g=3 is assumed, i.e. in the weighted mean value algorithm the greater control value has a weight three times greater than that of the smaller control value. Due to the heavier weighting of the greater control value, the vehicle is guided, in the event of a fault, quickly into a safe state (for example into a braking or braked state or standstill).

TABLE 1

Control value as a function of $B_{large}$ and $B_{small}$; g = 3

| $B_{large}$ | $B_{small}$ | | | | | |
|---|---|---|---|---|---|---|
| | 1.0 | 0.8 | 0.6 | 0.4 | 0.2 | 0.0 |
| 1.0 | 1 | 0.95 | 0.9 | 0.85 | 0.80 | 0.75 |
| 0.8 | — | 0.8 | 0.75 | 0.70 | 0.65 | 0.60 |
| 0.6 | — | — | 0.6 | 0.55 | 0.50 | 0.45 |
| 0.4 | — | — | — | 0.4 | 0.35 | 0.3 |
| 0.2 | — | — | — | — | 0.2 | 0.15 |
| 0.0 | — | — | — | — | — | 0.0 |

The example with the weighting g=3 shows that, in the considered extreme case, i.e. one FCU requests full braking, but the other do not brake, a braking force of 75% is applied. It is also clear from Table 1 that in a fault-free scenario (diagonal in Table 1), there is no modification of the control value.

In contrast to systems based on analogue technology, in digital systems the effects of a fault on the result are unpredictable. In order to further cushion an extreme spontaneous reaction of the PS (in the above example the motor vehicle) caused by a fault, in the event of the sudden occurrence of a large difference between the calculated control values of the two FCUs, the control value Bi in the cycle i may be further corrected by means of the formation of a weighted mean value from the current control value and the control value of the immediately previous cycle i−1. For this purpose it is proposed for the AST 100 to calculate a corrected control value $B_{icor}$ as follows $$B_{icor} = (B_i + B_{i-1} \cdot (B_{large} - B_{small}))/(1 + B_{large} - B_{small})$$

If $(B_{large} - B_{small}) = 0$ (equal control values), then $B_{icor} = B_i$, i.e. there is no correction. If, by contrast, $(B_{large} - B_{small}) = 1$ (extreme case) then $B_{icor} = (B_i + B_{i-1})/2$, i.e. $B_{icor}$ assumes the mean value of the two last cycles. For all other values of $(B_{large} - B_{small})$ the value $B_{icor}$ lies between these two limits. This calculation of the corrected control value $B_{icor}$ leads to the cushioning of a spontaneous reaction caused by a fault.

The proposed method can be implemented in redundant systems with relatively little outlay and leads to a significant increase of the reliability and safety of autonomous control systems.

CITED LITERATURE

[1] US Pat Appl 20090299713. Miller, P. J. et al. *Method of Modelling the Effect of a Fault on the Behavior of a System*. Published on Dec. 3, 2009.
[2] Austrian patent application A 200/2013 by FTS Computertechnik. *Vorrichtung und Verfahren zur autonomen Steuerung von Kraftfahrzeugen* (Device and method for autonomous control of motor vehicles). Filed on 14 Mar. 2013
[3] Littlewood, B. & L. Strigini, (1993). *Validation of ultra-high dependability for software-based systems*. Comm. ACM. Vol. 36(11). (pp. 69-80).
[4] NCAP Rating Group. *EURO NCAP Rating Review* 2012. Online at: http://www.euroncap.com
[5] Kopetz, H. Real-Time Systems, *Design Principles for Distributed Embedded Applications*. Springer Publishing Company. 2011.

The invention claimed is:

1. A method for limiting the risk of faults in an autonomic emergency braking (AEB) system of a vehicle, wherein the AEB system comprises two diversely redundant and independent fault-containment units (FCUs) (110, 120) and an actuator controller (AST) (100), the method comprising:
   determining by each of the FCUs (110, 120) a control value for a braking force;
   calculating by the AST (100), a new control value for the braking force from the control values for the braking force determined by the FCUs (110, 120), in such a way that, if determined control values of the FCUs (110, 120) deviate, the vehicle is guided into a safe state;
   calculating by the AST (100), by means of the application of a weighted mean value algorithm which weights the control values of the FCUs (110, 120) stipulating a higher braking force more heavily by a predefined weight (g) than the control values of the FCUs (110, 120) stipulating a lower braking force, a new control value for the braking force from the two control values for the braking force determined by means of diverse redundancy by the FCUs (110, 120); and
   using the new control value for the braking force in the vehicle.

2. The method of claim 1, wherein the control value determined in a current cycle, by means of a formation of a further weighted mean value from the control value of a past cycle and the determined control value in the current cycle, is corrected in such a way that the weighting of the control value in the past cycle increases when a difference between the two control values calculated in the current cycle increases.

3. The method of claim 1, wherein the AST (100) is formed on a self-checking hardware.

4. The method of claim 1, wherein the AST (100) files a fault message in a diagnosis store in the event of an occurrence of unequal control values.

5. An autonomic emergency braking (AEB) system of a vehicle, the system comprising:
   two diversely redundant and independent fault-containment units (FCUs) (110, 120), wherein each FCU (110, 120) determines a control value for the braking force; and
   an actuator controller (AST) (100), which calculates a new control value for the braking force from the control values for the braking force determined by the FCUs (110, 120), in such a way that, if determined control values of the FCUs (110, 120) deviate, the vehicle is guided into a safe state,
   wherein the AST (100), by means of the application of a weighted mean value algorithm which weights the control values of the FCUs (110, 120) stipulating a higher braking force more heavily by a predefined weight (g) than the control values of the FCUs (110, 120) stipulating a lower braking force, calculates a new control value for the braking force from the two control values for the braking force determined by means of diverse redundancy by the FCUs (110, 120), and uses this new control value for the braking force in the vehicle.

6. The system of claim 5, wherein the control value determined in a current cycle, by means of a formation of a further weighted mean value from the control value of a past cycle and the determined control value in the current cycle, is corrected in such a way that the weighting of the control value in the past cycle increases when a difference between the two control values calculated in the current cycle increases.

7. The system of claim 5, wherein the AST (100) is formed on a self-checking hardware.

8. The system of claim 5, wherein the AST (100) files a fault message in a diagnosis store in the event of an occurrence of unequal control values.

9. A motor vehicle, comprising:
   an autonomic emergency braking (AEB) system, comprising:
      two diversely redundant and independent fault-containment units (FCUs) (110, 120), wherein each FCU (110, 120) determines a control value for the braking force; and
      an actuator controller (AST) (100), which calculates a new control value for the braking force from the control values for the braking force determined by the FCUs (110, 120), in such a way that, if determined control values of the FCUs (110, 120) deviate, the motor vehicle is guided into a safe state,
      wherein the AST (100), by means of the application of a weighted mean value algorithm which weights the control values of the FCUs (110, 120) stipulating a higher braking force more heavily by a predefined weight (g) than the control values of the FCUs (110, 120) stipulating a lower braking force, calculates a new control value for the braking force from the two control values for the braking force determined by means of diverse redundancy by the FCUs (110, 120), and uses this new control value for the braking force in the motor vehicle.

* * * * *